United States Patent
Trim et al.

(10) Patent No.: US 10,694,614 B2
(45) Date of Patent: **\*Jun. 23, 2020**

(54) AUTOMATIC TARGETED ILLUMINATION BASED ON AGGREGATE ILLUMINATION FROM MULTIPLE LIGHT SOURCES

(71) Applicant: INTERNATIONAL BUSINESS MACHINES CORPORATION, Armonk, NY (US)

(72) Inventors: Craig M. Trim, Ventura, CA (US);
Victor Povar, Vancouver (CA);
Sarbajit K. Rakshit, Kolkata (IN);
Ahmed Nassar, Pflugerville, TX (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/531,508

(22) Filed: Aug. 5, 2019

(65) Prior Publication Data

US 2020/0170086 A1 May 28, 2020

Related U.S. Application Data

(63) Continuation of application No. 16/202,302, filed on Nov. 28, 2018, now Pat. No. 10,455,669.

(51) Int. Cl.
*H05B 47/19* (2020.01)
*H05B 47/105* (2020.01)

(52) U.S. Cl.
CPC .......... *H05B 47/19* (2020.01); *H05B 47/105* (2020.01)

(58) Field of Classification Search
CPC .... H05B 33/08; H05B 33/0482; H05B 37/02; H05B 37/0227; H05B 37/0263;
(Continued)

(56) References Cited

U.S. PATENT DOCUMENTS 8,264,168 B2 9/2012 Feri et al.
8,331,908 B2 12/2012 Verthein et al.
(Continued)

OTHER PUBLICATIONS

U.S. Appl. No. 16/202,302.*
(Continued)

*Primary Examiner* — Jimmy T Vu
(74) *Attorney, Agent, or Firm* — James Nock; Andrew D. Wright; Roberts Calderon Safran & Cole, P.C.

(57) ABSTRACT

Systems and methods for automatic targeted illumination based on aggregate illumination from multiple light sources are disclosed. In embodiments, a method includes: determining, by a computing device, a localized area of a defined physical location based on received location information; determining, by the computing device, a desired level of brightness for the localized area; calculating, by the computing device, an illumination level at the localized area based on current illumination levels of lighting devices within the defined physical location and locations of the lighting devices within the defined physical location; generating, by the computing device, instructions to effect a change in one or more of the lighting devices, wherein the change in the one or more lighting devices results in the desired level of brightness for the localized area; and sending, by the computing device, the instructions to at least one controller of the one or more lighting devices.

20 Claims, 5 Drawing Sheets

(58) Field of Classification Search
CPC .... H05B 37/0272; H05B 47/00; H05B 47/19; H05B 47/105
See application file for complete search history.

(56) References Cited

U.S. PATENT DOCUMENTS

| | | | |
|---|---|---|---|
| 8,373,366 | B2 | 2/2013 | Baaijens et al. |
| 9,131,550 | B2 * | 9/2015 | Schenk .................. H05B 47/19 |
| 2012/0013257 | A1 | 1/2012 | Sibert |
| 2016/0345414 | A1 | 11/2016 | Nolan et al. |
| 2017/0142809 | A1 | 5/2017 | Paolini et al. |

OTHER PUBLICATIONS

Anonymous, "Inverse-square law", https://en.wikipedia.org/wiki/Inverse-square_law, Wikipedia, accessed Oct. 17, 2018, 8 pages.

Hoffman, "How to Improve Your Android Phone's Automatic Brightness With Lux", http://www.howtogeek.com/168127/how-to-improve-your-android-phones-automatic-brightness-with-lux/, howtogeek.com, Jul. 21, 2013, 5 pages.

Chaitanya, "3 Best apps to Lower/Dim Screen brightness more on Androidi{Reduce screen brightness even less than minimum [Remove sharper colors for night reading]", http://techapple.net/2015/07/3-best-apps-to-lowerdim-screen-brightness-more-on-androidreduce-screen-brightness-even-less-than-minimum-remove-sharper-colors-for-night-reading/, techapple.net, Jul. 2, 2015, 4 pages.

Cooper, "Adjusting Brightness", https://learn.adafruit.com/all-about-leds/adjusting-brightness, adafruit.com, accessed Nov. 8, 2018, 4 pages.

Anonymous, "How to Vary the Brightness of an LED", http://www.learningaboutelectronics.com/Articles/How-to-vary-the-brightness-of-an-led, learningaboutelectronics.com, accessed Nov. 8, 2018, 2 pages.

List of IBM Patents or Patent Applications Treated as Related, Aug. 5, 2019, 1 page.

Specification "Automatic Targeted Illumination Based on Aggregate Illumination From Multiple Light Sources" and Drawings in U.S. Appl. No. 16/202,302, filed Nov. 28, 2018, 41 pages.

* cited by examiner

AUTOMATIC TARGETED ILLUMINATION BASED ON AGGREGATE ILLUMINATION FROM MULTIPLE LIGHT SOURCES

BACKGROUND

The present invention relates generally to lighting controls and, more particularly, to automatic targeted illumination based on aggregate illumination from multiple light sources.

Smartphones and other mobile user devices are increasingly being utilized to interface with remote electronic devices. In one example, mobile phones are utilized to control lights, curtains and/or a thermostat via communication with an on-site controller. Various additional methods have been developed for selectively changing lighting within an enclosed space. For example, systems have been described which associate selectable buttons with lighting scenes stored as profiles, wherein a user can press one of the buttons to change lighting within a home based on the stored profiles.

SUMMARY

In an aspect of the invention, a computer-implemented method includes: determining, by a computing device, a localized area of a defined physical location based on received location information; determining, by the computing device, a desired level of brightness for the localized area; calculating, by the computing device, an illumination level at the localized area based on current illumination levels of lighting devices within the defined physical location and locations of the lighting devices within the defined physical location; generating, by the computing device, instructions to effect a change in one or more of the lighting devices, wherein the change in the one or more lighting devices results in the desired level of brightness for the localized area; and sending, by the computing device, the instructions to at least one controller of the one or more lighting devices.

In another aspect of the invention, there is a computer program product including a computer readable storage medium having program instructions embodied therewith. The program instructions are executable by a computing device to cause the computing device to: determine a localized area of a defined physical location based on an image of the defined physical location; determine a desired level of brightness for the localized area based on user input; calculate an illumination level at the localized area based on current illumination levels of lighting devices within the defined physical location, and locations of the lighting devices within the defined physical location; generate instructions to effect a change in one or more of the lighting devices, wherein the change in the one or more lighting devices results in the desired level of brightness for the localized area; and send the instructions to at least one controller of the one or more lighting devices.

In another aspect of the invention, there is a system including: a processor, a computer readable memory and a computer readable storage medium associated with a computing device; a plurality of lighting devices within a defined physical location; program instructions to determine a localized area of the defined physical location based on data received by the computing device; program instructions to determine a desired level of brightness for the localized area; program instructions to calculate an illumination level at the localized area based on current illumination levels of the lighting devices and locations of the lighting devices within the defined physical location; program instructions to generate instructions to effect a change in one or more of the lighting devices, wherein the change in the one or more lighting devices results in the desired level of brightness for the localized area; and program instructions to send the instructions to at least one controller of the one or more lighting devices. The program instructions are stored on the computer readable storage medium for execution by the processor via the computer readable memory.

BRIEF DESCRIPTION OF THE DRAWINGS

The present invention is described in the detailed description which follows, in reference to the noted plurality of drawings by way of non-limiting examples of exemplary embodiments of the present invention.

DETAILED DESCRIPTION

Figure 1:
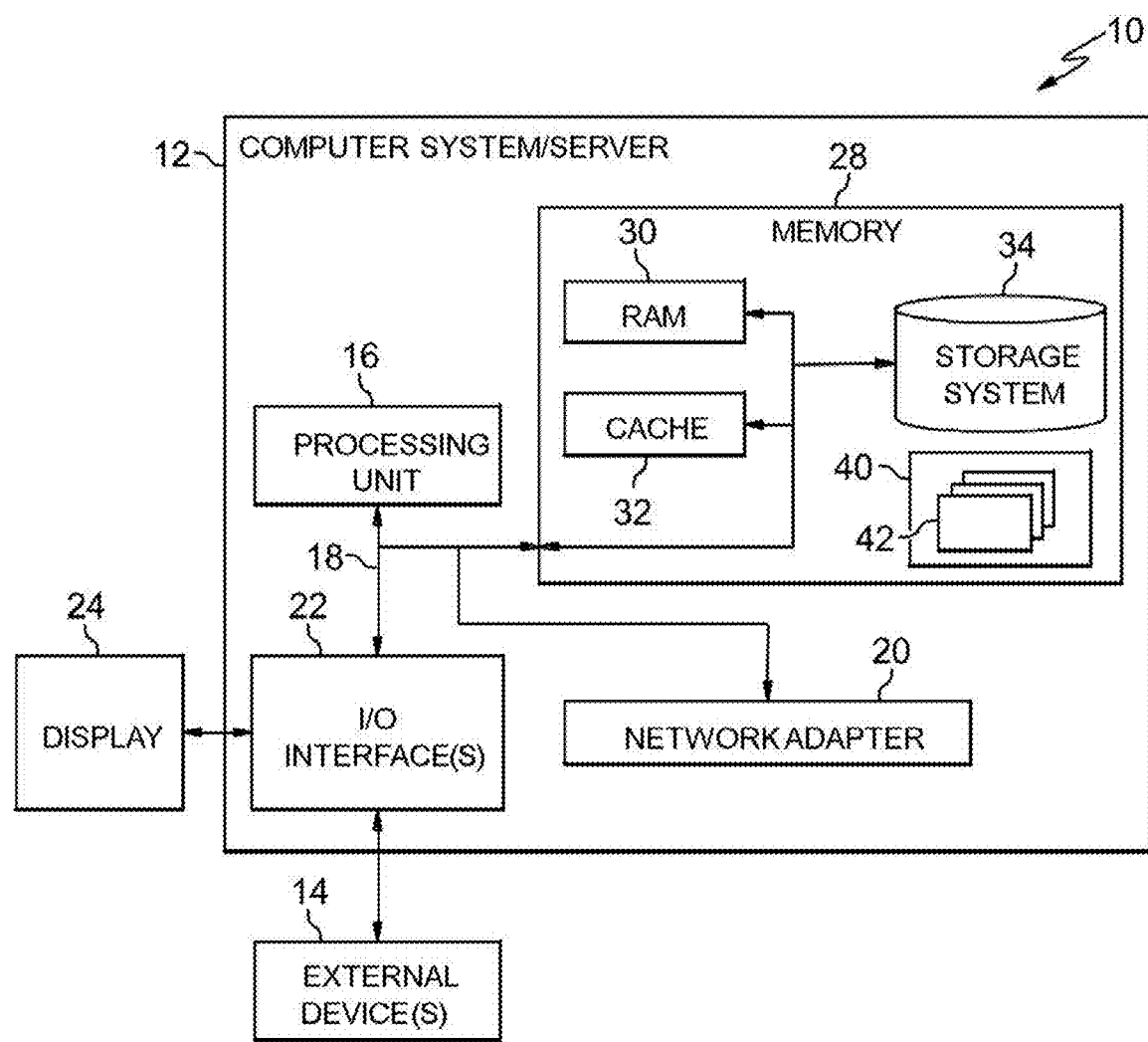
FIG. 1 depicts a computing infrastructure according to an embodiment of the present invention.

The present invention relates generally to lighting controls and, more particularly, to automatic targeted illumination based on aggregate illumination from multiple light sources. In embodiments, a system is provided for changing the level of brightness at a localized area within a larger defined physical location, based on current illumination levels of lighting devices at the physical location, the location of the lighting devices in the physical location, and user data. In embodiments, to change the level of brightness of any area within a location, a user focuses his or her mobile device camera towards the area, and with touchscreen finger gestures or the like, the user indicates a desired change to the brightness of the area. In aspects, based on a level of brightness selected by the user, software will automatically change the level of brightness of each participating light source at the location so that a desired/required level of brightness can be achieved in the select area. In embodiments, the user can use their mobile device to create various types of event-based brightness control rules for a location. In aspects, a lighting control system of the invention identifies the event based on camera feed analysis, surrounding context analysis, sensor data, etc.

In an enclosed location (e.g., an auditorium, a room, etc.) multiple sources of light (lighting devices) are placed to illuminate the location. Each source of light contributes to the illumination in the location. Changing individual light sources may not provide the required amount of brightness desired for a select portion of the location. Existing methods of remotely controlling individual light sources do not address this problem of select illumination.

Advantageously, embodiments of the invention provide improvements to the function of mobile devices by enabling the mobile devices to dynamically adjust lighting at a location to provide a desired illumination level for a select area within the location, based on positioning of on-site lights and current illumination levels. In aspects, dynamic adjustment of lighting includes effecting a change in brightness (illumination level) and/or position of lighting devices at a location. Implementations of the invention utilize unconventional steps to enable a lighting system to calculate actual and desired aggregate illumination levels (illumination from multiple light sources) at a select area within a defined location. Thus, embodiments of the invention provide a technical solution to the problem of controlling illumination at a localized area within a larger location, when the illumination is provided by multiple spaced light sources. Unlike existing methods that remotely control light sources individually, the present invention enables a user to select an area, and then automatically change the brightness level for that area based on the determined cumulative lighting effects of multiple light sources.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Referring now to FIG. 1, a schematic of an example of a computing infrastructure is shown. Computing infrastructure 10 is only one example of a suitable computing infrastructure and is not intended to suggest any limitation as to the scope of use or functionality of embodiments of the invention described herein. Regardless, computing infrastructure 10 is capable of being implemented and/or performing any of the functionality set forth hereinabove.

In computing infrastructure 10 there is a computer system (or server) 12, which is operational with numerous other general purpose or special purpose computing system environments or configurations. Examples of well-known computing systems, environments, and/or configurations that may be suitable for use with computer system 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system 12 may be described in the general context of computer system executable instructions, such as program modules, being executed by a computer system. Generally, program modules may include routines, programs, objects, components, logic, data structures, and so on that perform particular tasks or implement particular abstract data types. Computer system 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system 12 in computing infrastructure 10 is shown in the form of a general-purpose computing device. The components of computer system 12 may include, but are not limited to, one or more processors or processing units (e.g., CPU) 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system 12 typically includes a variety of computer system readable media. Such media may be any available media that is accessible by computer system 12, and it includes both volatile and non-volatile media, removable and non-removable media.

System memory 28 can include computer system readable media in the form of volatile memory, such as random access memory (RAM) 30 and/or cache memory 32. Computer system 12 may further include other removable/non-removable, volatile/non-volatile computer system storage media. By way of example only, storage system 34 can be provided for reading from and writing to a nonremovable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system 12 may also communicate with one or more external devices 14 such as a keyboard, a pointing device, a display 24, etc.; one or more devices that enable a user to interact with computer system 12; and/or any devices (e.g., network card, modem, etc.) that enable computer system 12 to communicate with one or more other computing devices. Such communication can occur via Input/Output (I/O) interfaces 22. Still yet, computer system 12 can communicate with one or more networks such as a local area network (LAN), a general wide area network (WAN), and/or a public network (e.g., the Internet) via network adapter 20. As depicted, network adapter 20 communicates with the other components of computer system 12 via bus 18. It should be understood that although not shown, other hardware and/or software components could be used in conjunction with computer system 12. Examples, include, but are not limited to: microcode, device drivers, redundant processing units, external disk drive arrays, RAID systems, tape drives, and data archival storage systems, etc.

Figure 2:
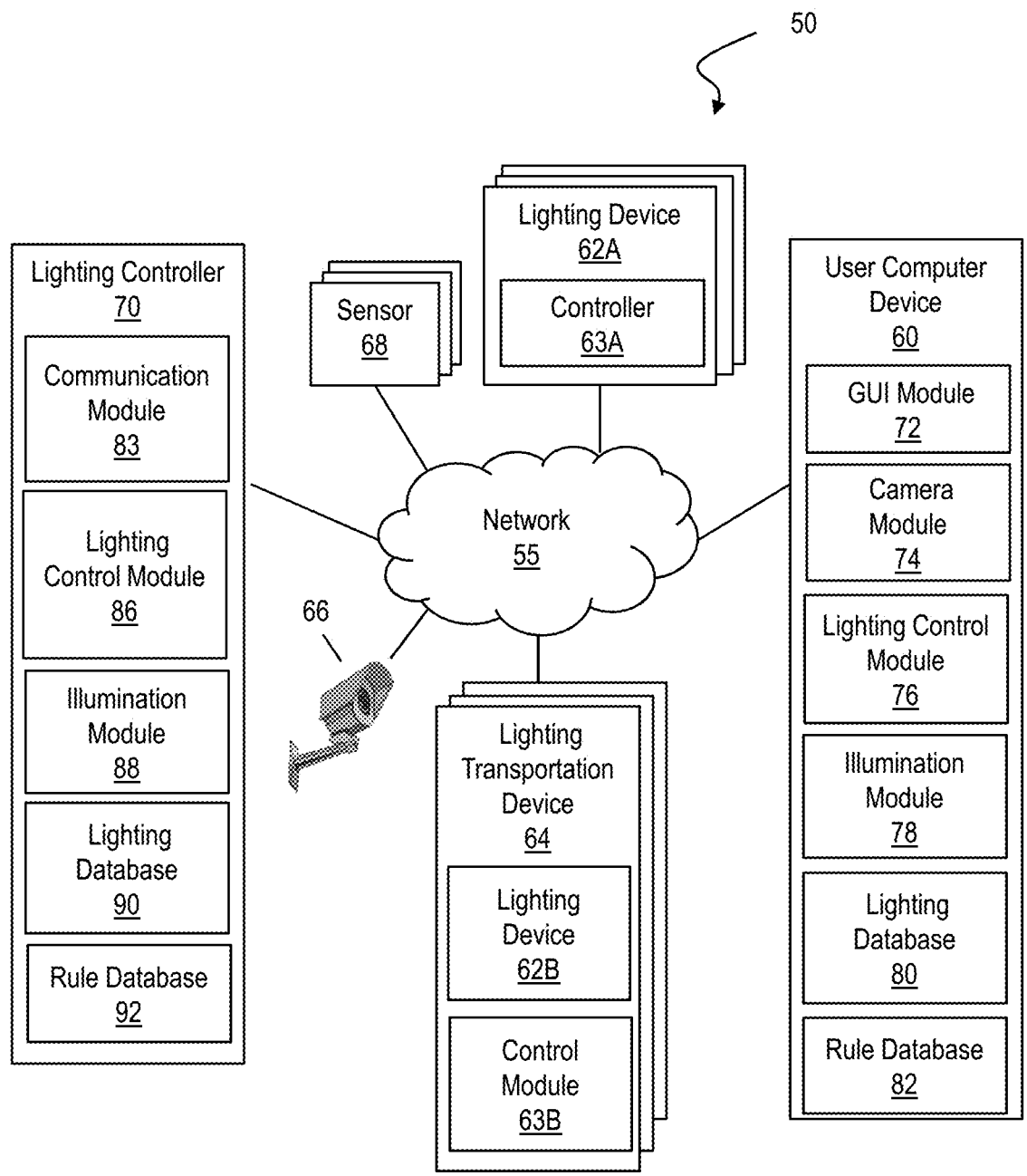
FIG. 2 shows an exemplary environment in accordance with aspects of the invention.

FIG. 2 shows an exemplary location illumination environment 50 in accordance with aspects of the invention. The location illumination environment 50 includes a network 55 connecting a user computer device 60 with a plurality of lighting devices 62A. Lighting devices 62A can be any desired type of lighting device, including personal lamps, professional lighting devices, light emitting diodes, light bulbs, or other types of devices that are configured to provide light. In aspects, the location illumination environment 50 includes one or more of the following: one or more lighting transportation devices 64 for adjusting the position of respective repositionable lighting devices 62B, one or more cameras 66, and one or more sensors 68. In embodiments, the user computer device 60 is in communication with a lighting controller 70 via the network 55.

The network 55 may be any suitable communication network or combination of networks, such as a local area network (LAN), a general wide area network (WAN), and/or a public network (e.g., the Internet). In embodiments, the user computer device 60 comprises the computer system 12 of FIG. 1, and is connected to the network 55 via the network adapter 20 of FIG. 1. In aspects, the user computer device 60 is a mobile device, such as a smartphone, tablet, laptop computer, etc.

In implementations, the user computer device 60 includes a plurality of program modules (e.g., program module 42 of FIG. 1) executed by the user computer device 60 and configured to perform one or more functions described herein. In embodiments, the user computer device 60 includes one or more of: a graphical user interface (GUI) module 72 configured to provide a user interface for illumination controlling aspects of the invention; a camera module 74 configured to obtain and/or analyze image data from a camera (not shown) of the user computer device 60; a lighting control module 76 configured to control illumination levels and/or positioning of lighting devices at a location (e.g., lighting devices 62A, 62B); and an illumination module 78 configured to calculate changes in illumination levels and/or positioning of lighting devices 62A, 62B based on desired illumination levels for a particular area of a predetermined location, current illumination levels, and locations of the lighting devices 62A, 62B. In implementations, the illumination module 78 utilizes stored information regarding the position of lighting devices 62A, 62B within a location, current illumination levels of the lighting devices 62A, 62B, and/or historic lighting preferences of a user in a lighting database 80. In aspects, the user computer device 60 receives lighting rules data from a user and saves rules based thereon in a rule database 82.

In embodiments, certain functions discussed above with respect to the user computer device 60 are implemented at the remote lighting controller 70. In implementations, the lighting controller 70 includes components of the computer system 12 of FIG. 1, and is connected to the network 55 via a network adapter (e.g., the network adapter 20 of FIG. 1). The lighting controller 70 may be configured as a special purpose computing device that is part of a lighting system for a location. For example, the lighting controller 70 may be a special purpose computing device dedicated to illumination control of lighting devices 62A, 62B at an indoor or outdoor venue. In embodiments, the lighting controller 70 is a cloud-based server providing illumination control services to one or more physical locations.

In implementations, the lighting controller 70 includes a plurality of program modules (e.g., program module 42 of FIG. 1) executed by the lighting controller 70 and configured to perform one or more functions described herein. In aspects, the lighting controller 70 includes a communication module 83 configured to receive data from one or more user computer devices (e.g., user computer device 60). In aspects, the communication module 83 provides a user interface to a plurality of user computer devices 60, enabling users to provide data regarding light preferences to the lighting controller 70. In embodiments, the lighting controller 70 includes a lighting control module 86 configured to control illumination levels and/or positioning of lighting devices 62A, 62B at a location, and an illumination module 88 configured to calculate changes in illumination levels and/or positioning of lighting devices 62A, 62B based on desired illumination levels for a particular area of a predetermined location, current illumination levels, and locations of the lighting devices 62A, 62B. In implementations, the illumination module 88 utilizes stored information regarding the position of lighting devices 62A, 62B within a location, current illumination levels of the lighting devices 62A, 62B, and/or historic lighting preferences of a user from a lighting database 90. In aspects, the lighting controller 70 receives lighting rules data from a user (e.g., from user computer device 60) and saves rules based thereon in a rule database 92.

In implementations, the one or more lighting devices 62A include associated controllers 63A configured to receive instructions from the user computer device 60 and/or the lighting controller 70, wherein the controllers 63A adjusts illumination levels of an associated lighting device 62A based on the received instructions. In aspects, one controller 63A is responsible for controlling illumination of multiple lighting devices 62A.

In implementations, the one or more lighting transportation devices 64 of the present invention utilize mechanical and/or electrical tools or equipment to adjust the position and/or illumination levels of an associated lighting device 62B based on instructions received by a control module 63B of the lighting transportation device 64. In aspects, one control module 63B is responsible for the adjustment of multiple lighting devices 62B.

In embodiments, the one or more sensors 68 are configured to send data (e.g., real-time data) to one of the user computer device 60 and lighting controller 70 via the network 55 for use in determining a triggering event has occurred and/or determining a location of a user within a location. Similarly, in aspects, the one or more cameras 66 may be configured to send data (e.g., real-time data) to one of the user computer device 60 and lighting controller 70 via the network 55 for use in determining a triggering event has occurred and/or determining a location of a user within a location.

The quantity of devices and/or networks in the location illumination environment 50 is not limited to what is shown in FIG. 2. In practice, the location illumination environment 50 may include additional devices and/or networks; fewer devices and/or networks; different devices and/or networks; or differently arranged devices and/or networks than illustrated in FIG. 2. Also, in some implementations, one or more of the devices of the location illumination environment 50 may perform one or more functions described as being performed by another one or more of the devices of the location illumination environment 50. Devices of the location illumination environment 50 may interconnect via wired connections, wireless connections, or a combination of wired and wireless connections. In aspects, additional or fewer components than those shown in FIG. 2 are utilized, separate components are integrated into a single computing component or module, or single components or modules are implemented as multiple computing components or modules.

Figure 3:
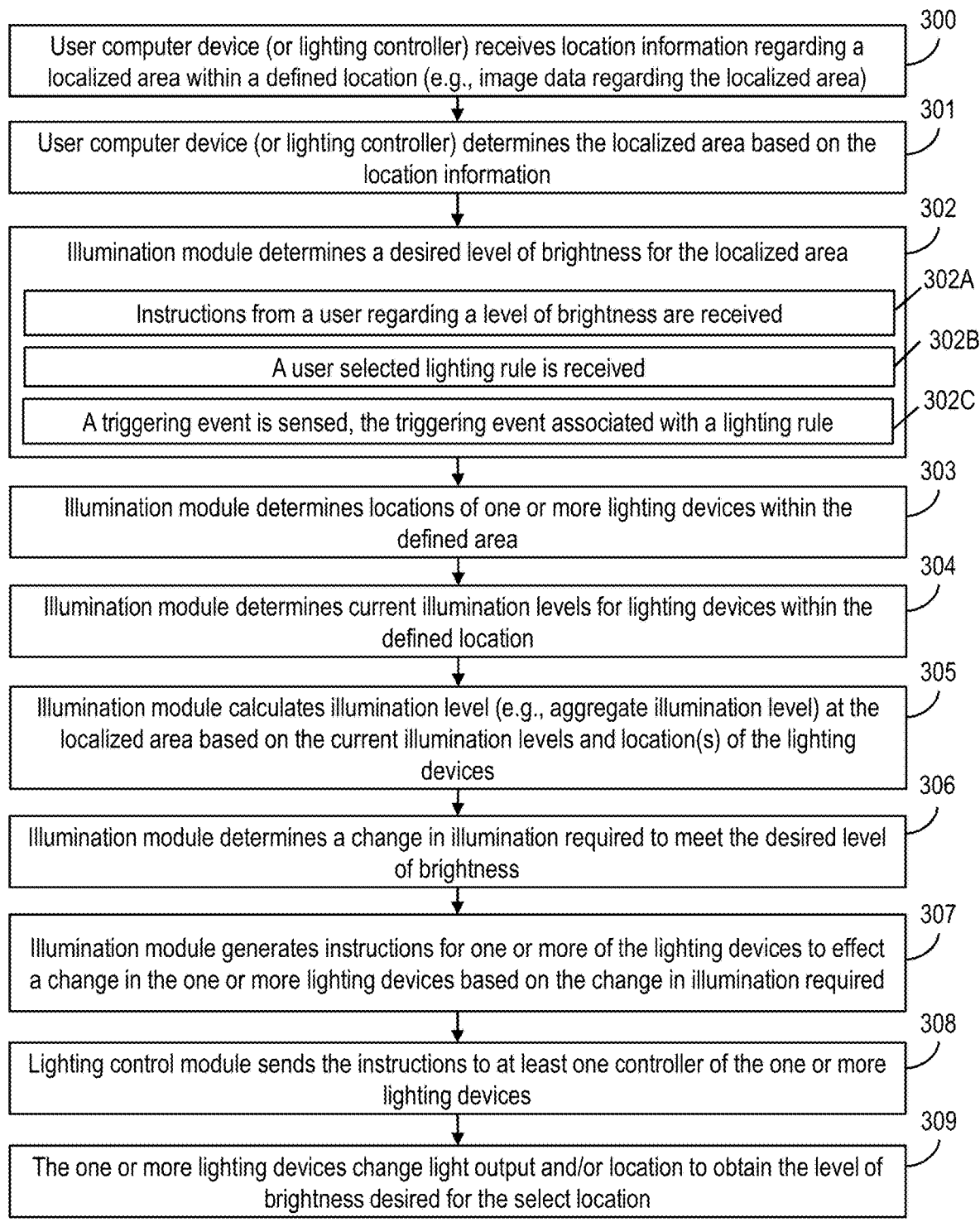
FIG. 3 shows a flowchart of steps of a method in accordance with aspects of the invention.

FIG. 3 shows a flowchart of a method in accordance with aspects of the invention. Steps of the method of FIG. 2 may be performed in the environment illustrated in FIG. 2, and are described with reference to elements shown in FIG. 2. Embodiments of the invention are performed utilizing the user computer device 60 to determine and implement illumination changes within a physical location. In alternative implementations, the user computer device 60 is utilized in conjunction with a remote lighting controller 70 to determine and implement illumination changes within a physical location.

At step 300, the user computer device 60 receives location information regarding a select or localized area within a larger defined physical location. The physical location may be an enclosed location, such as a theatre or stadium, and may be an indoor or an outdoor location. In aspects, the location information is in the form of image data from a camera (not shown) of the user computer device 60, or global positioning system (GPS) location information. Various location information tools and methods may be utilized by the location illumination environment 50 of the present invention to determine a localized area of interest to a user within the larger defined location. In embodiments, image data is obtained when a user utilizes a GUI module 72 of the user computer device 60 to capture image data (e.g., still frame or streaming) of an area of interest to the user (i.e., localized area) within a larger location. For example, a user may utilize a camera (not shown) of the user computer device 60 to capture image data of a center stage area within a larger theatre location. In embodiments, the user computer device 60 receives the location information from a remote device, such as from one or more on-site cameras 66 and/or sensors 68. In embodiments, the on-site cameras 66 provide image data to the user computer device 60, which can be analyzed to determine a specific location of a user within the larger defined physical location. Similarly, the on-site sensors 68 may provide sensor data (e.g., motion sensing data) to the user computer device 60, which can be analyzed to determine a specific location of a user within the larger defined physical location. Alternatively, the lighting controller 70 may receive the location information in accordance with step 300, such as from the user computer device 60, on-site cameras 66 and/or on-site sensors 68.

At step 301, the user computer device 60 determines the select or localized area of interest (hereafter localized area) based on the location information received at step 300. In aspects, the user computer device 60 includes image processing tools enabling the user computer device 60 to identify the localized area from image data captured by a camera (not shown) of the user computer device 60 or an on-site camera 66 according to step 300. In implementations, the user computer device 60 recognizes that the user computer device 60 is within the localized area utilizing contextual analysis and artificial intelligence tools. In aspects, the user computer device 60 determines the localized area based on sensor data received from one or more on-site sensors 68. In embodiments, the localized area comprises a current location of a movable object (e.g., the user computer device 60) within the defined physical location.

In alternative embodiments, the lighting controller 70 determines the localized area based on location information obtained from the user computer device 60. It should be understood that methods utilized by the user computer device 60 to determine the localized area discussed above may be utilized by the lighting controller 70 in such alternative embodiments. In one example, the lighting controller 70 obtains a digital image from a camera (not shown) of the user computer device 60, and analyzes the digital image to determine the localized area shown in the digital image.

At step 302, the illumination module 78 of the user computer device 60, or alternatively, the illumination module 88 of the lighting controller 70, determines a desired level of brightness for the localized area determined at step 301. In embodiments, the illumination module 78 or 88 determines the desired level of brightness (illumination level) based on instructions received from a user (e.g., user computer device 60) regarding a desired level of brightness, in accordance with substep 302A.

In one example, a user interacts with a touchscreen of the user computer device 60 (e.g., using finger swipes, pinches or other touchscreen input methods) to indicate the level of brightness desired for the localized area shown as real-time camera image data on the touchscreen. In one implementation, the localized area is shown in an augmented reality display on a touchscreen of the user computer device 60, wherein an actual image of the localized area is augmented with virtual illumination. In aspects, the augmented display is shared between the user computer device 60 and the lighting controller 70. In this implementation, a user may utilize touchscreen commands (e.g., finger swipes, etc.) to cause the virtual illumination to increase or decrease in brightness, wherein the illumination module 78 or 88 recognizes the increase or decrease in brightness as a desired level of brightness for the localized area. With such an embodiment, the brightness viewed by a user in the virtual image of the user computer device 60 may be reflected in the physical localized area with implementation of the lighting control steps discussed below.

Still referring to step 302, in embodiments, the illumination module 78 or 88 determines a desired level of brightness for the localized area based on a user selected predetermined lighting rule, in accordance with substep 302B. For example, a user may utilize a GUI generated by the GUI module 72 of the user computer device 60 to select one or more predetermined lighting rules from the lighting database 80. In this example, the user selection is received by the illumination module 78 or 88, which determines the level of brightness based on the one or more predetermined lighting rules selected. In aspects, a user is enabled through the user computer device 60 to create calendar based brightness control rules. In one example, a user focuses a camera of the user computer device 60 on a localized area of a physical location, indicates a change in the level of brightness for the localized area (e.g., using finger swipes), and is presented with an option to select an event or calendar based rule for the desired level of brightness. In this way, rules may be saved by the user computer device 60 in the rule database 82, which enable the user computer device to automatically implement predetermined brightness levels at the localized area according to the saved rules (e.g., at a certain time, when a certain event is occurring, etc.). Similarly, in alternative embodiments, the lighting controller 70 utilizes rules in the rule database 92 to implement step 302B.

With continued reference to step 302, in embodiments, the illumination module 78 or 88 determines that a triggering event has occurred, and determines a desired lighting level for the localized area based on predetermined rules associated with the triggering event in accordance with substep 302C. In one example, the user computer device 60 determines, based on the location information received at step 300, that a user has entered his or her office space, and determines the desired illumination level for a desk area of the office space based on predetermined rules for the office space stored in the lighting database 80. In embodiments, historic user lighting trend data is gathered and/or analyzed by the illumination module 78 or 88 in order to determine the desired lighting level for the localized area. In another example, a user needs more brightness for a predefined action or activity (e.g., reading). In embodiments, the illumination module 78 or 88 identifies that the user is performing the predefined activity (e.g., reading content) based on image data received from the one or more on-site cameras 66, and recognizes this as the triggering event.

In embodiments, step 302 is implemented based on stored user preference data. For example, the illumination module 78 or 88 may determine that a user of the user computer device 60 is associated with stored user preference data indicating the user's preference for a level of illumination associated with the activity of reading.

At step 303, the illumination module 78 or 88 determines locations of the lighting devices 62A, 62B within the physical location. In aspects, the illumination module 78 or 88 stores and/or accesses lighting device location data (e.g., coordinates or mapping data) in the lighting database 80 or 90.

At step 304, the illumination module 78 or 88 determines current illumination levels for lighting devices 62A and/or 62B within the defined physical location. In embodiments, the illumination module 78 or 88 accesses current illumination level data stored in the lighting database 80 or 90. In aspects, the illumination module 78 or 88 utilizes light sensor data from the on-site sensor 68 or other illumination data in order to determine current illumination levels of the lighting devices 62A and/or 62B.

At step 305, the illumination module 78 or 88 calculates an illumination level at the localized area based on the current illumination levels determined at step 304 and the location of the lighting devices 62A and/or 62B determined at step 303. In embodiments, the illumination module 78 or 88 calculates the illumination level using the distance of respective light sources (lighting devices 62A, 62B) from the localized area. In aspects, multiple sources of light are available at a physical location, wherein each source of light contributes to the light available across the entire physical location. The relationship between illumination and its effect at a distance is given by: $E=I/D^2$. In this case, the "D" is the distance from a light source to the localized area, the "I" is the illumination level at the light source, and the "E" is the illumination level at the distance "D". In embodiments, the camera module 74 of the user computer device 60 is configured to measure a distance of any object in an image captured by a camera of the user computer device 60, as well as lighting sources (e.g., lighting devices 62A, 62B).

At step 306, the illumination module 78 or 88 determines a change in illumination required to meet the desired level of brightness (of step 302). In aspects, the illumination module 78 or 88 determines the change in illumination required by comparing the current illumination level at the localized area of step 305 with the desired level of brightness determined at step 302. In embodiments, determining the required change in illumination comprises an overall illumination change needed to meet the desired level of brightness for the localized area, as well as individual illumination levels for each of the lighting devices 62A and/or 62B at the physical location. In embodiments, the required change in illumination additionally comprises one or more changes to the distance between a lighting device 62A, 62B and the localized area. For example, the illumination module 78 may determine that a change in illumination levels needed to meet the desired level of brightness at the localized area requires certain illumination levels as well as position changes among available lighting devices 62A and/or 62B. In one example, the illumination module 78 or 88 recognizes a triggering event comprising a user reading in a particular area of a physical location. In this example, the illumination module 78 or 88 automatically determines a change in the level of brightness for the particular area needed to meet the desired brightness level associated with reading rules stored in the rule database 82 or 92.

In embodiments, the illumination module 78 or 88 determines a change in illumination required to meet the desired level of brightness at a first localized area, while maintaining the desired level of brightness at a second localized area. For example, a user may select two localized areas of interest in accordance with step 301 of FIG. 3.

At step 307, the illumination module 78 or 88 generates instructions for one or more of the lighting devices 62A and/or 62B to effect a change in the one or more lighting devices 62A and/or 62B based on the change in illumination determined at step 306. In embodiments, the instructions comprise instructions to change the illumination level of one or more lighting devices 62A, 62B and/or instructions to change the physical position or location of the one or more lighting devices 62A, 62B. In embodiments, instructions are generated for more than one localized area within a physical location. For example, in the case where the user selects two localized areas of interest in accordance with step 301, the illumination module 78 or 88 generates instruction to effect a change in the one or more lighting devices 62A and/or 62B based on changes to meet desired illumination levels in both the localized areas of interest.

At step 308, the lighting control module 76 of the user computer device 60, or the lighting control module 86 of the lighting controller 70, sends the instructions of step 307 to at least one controller (e.g., controller 63A, control module 63B) of the one or more lighting devices. In implementations where the user computer device 60 acts as an illumination control system, the lighting control module 76 of the user computer device 60 may send instructions determined by the illumination module 78 to the controller 63A of the lighting devices 62A to effect a change in the illumination of the lighting devices 62A in accordance with the instructions. Similarly, the lighting control module 76 of the user computer device 60 may send instructions determined by the illumination module 78 to the control module 63B of the lighting devices 62B to effect a change in the illumination and/or the position/location of the lighting devices 62B in accordance with the instructions. In implementations, the control module 63B causes the lighting transportation device 64 to change the location or position of one or more lighting devices 62B according to instructions received from the lighting control module 76 or 86.

At step 309, the one or more lighting devices 62A, 62B change their illumination output and/or position/location to obtain the desired level of brightness for the localized area, in response to the controller 63A and/or 63B receiving the instructions at step 308. In one example, the lighting device 62A increases its light output based on instructions received at controller 63A from the lighting control module 86, and the lighting device 62B changes its position with respect to the localized area based on instructions received at the control module 63B from the lighting control module 86. Thus, embodiments of the invention enable a user to change a level of brightness in one or more localized areas of a physical location, wherein each active light source (e.g., lighting device 62A, lighting device 62B) at the location contributes a different portion of the change in the illumination level.

In embodiments, the localized area moves within the defined physical location. In such embodiments, the calculation of the illumination level at the localized area (step 305), the generating of the instructions to effect the change in the one or more of the lighting devices 62A, 62B (step 307), and the sending the instructions to the at least one controller (e.g., controller 63A, control module 63B) (step 308), are performed on a continuous or periodic basis based on movement of the movable object within the defined physical location. In this way, a desired illumination level can be maintained in real-time for the moving localized area (e.g., a user of the user computer device 60).

Based on the above, it should be understood that embodiments of the invention utilize the user computer device 60 as the illumination controller for the location illumination environment 50 of FIG. 2, and alternative embodiments of the invention utilize the lighting controller 70 as the illumination controller for the location illumination environment 50, with input from the user computer device 60.

Figure 4A:
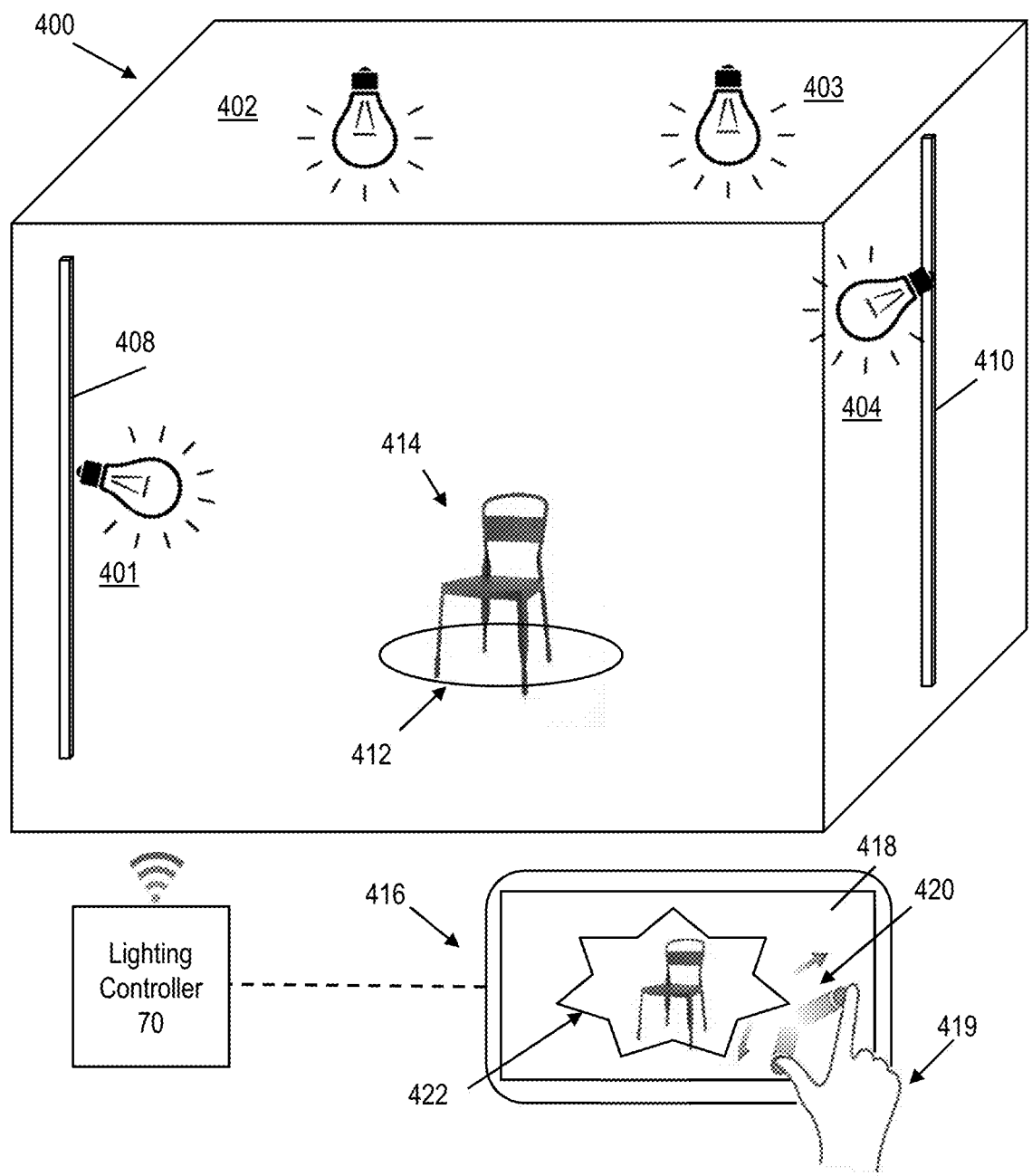
FIGS. 4A and 4B illustrate an exemplary use scenario in accordance with embodiments of the invention.
Figure 4B:
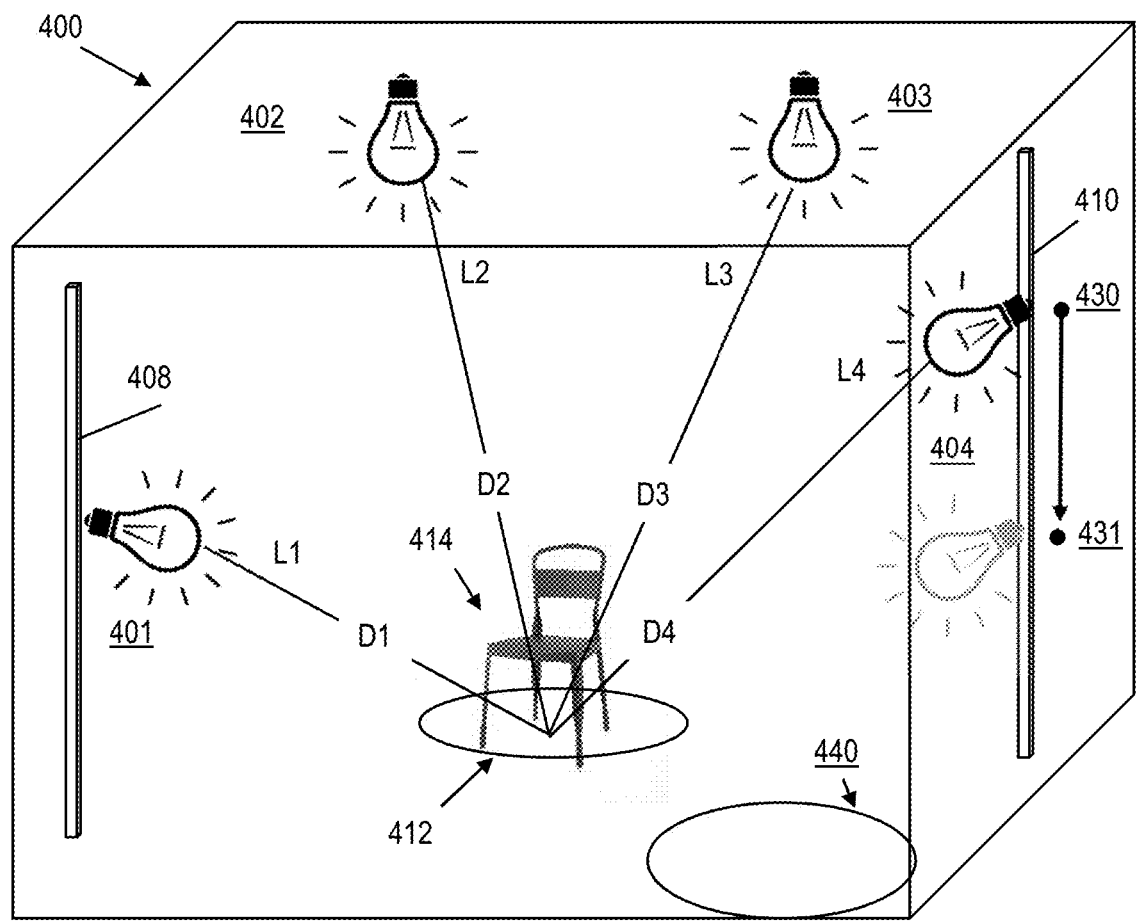

FIGS. 4A and 4B illustrate an exemplary use scenario in accordance with embodiments of the invention. The use scenario of FIGS. 4A and 4B may be implemented in the environment of FIG. 2 in accordance with method steps of FIG. 3.

FIG. 4A illustrates a defined physical location 400 including a plurality of light sources 401-404. Stationary light sources 402 and 403 may be in the form of lighting devices 62A of FIG. 2 having one or more controllers 63A for controlling illumination thereof. Repositionable light sources 401 and 404 are shown mounted to respective lighting transportation devices 408 and 410. The repositionable light sources 401 and 404 may be in the form of lighting device 62B of FIG. 2, with one or more control modules 63B controlling illumination and/or the position of the lighting sources 401 and 404. In the example, shown, the lighting transportation devices 408 and 410 comprise poles with moveable vertical tracks thereon (not shown) configured to move the repositionable lights 401 and 404 between different vertical levels or heights.

Still referencing FIG. 4A, a user computer device 60 is shown in the form of a smartphone 416 including a touchscreen 418. In accordance with step 300 of FIG. 3, a user indicated at 419 aims a camera (not shown) of the smartphone 416 at a localized area (an area of interest to the user) 412, which includes an object in the form of a chair 414. Image data from the camera is sent by the smartphone 416 to the lighting controller 70 for processing. In this embodiment, the lighting controller 70 determines the localized area 412 using image processing tools, wherein the lighting controller 70 recognizes the localized area 412 based on context analysis of the image (e.g., recognizing the chair 414, etc.). In the example of FIG. 4A, a user provides instructions regarding a desired level of brightness for the localized area 412 in accordance with step 302A. More specifically, the user utilizes finger commands (e.g., fingers swiping apart) indicated at 420 to instruct the user computer device 60 to increase the level of illumination in the onscreen image (depicted on the touchscreen 418). In this exemplary embodiment, the real-time camera image of the chair 414 is augmented with virtual illumination indicated at 422. The change in illumination represented by the virtual illumination 422 is communicated to the lighting controller 70, which determines the desired level of brightness for the localized area 412 based thereon.

Turning to FIG. 4B, the lighting controller 70: determines locations of the lighting devices 401-404 in accordance with step 303 of FIG. 3; determines current illumination levels L1-L4 of the lighting devices 401-404 in accordance with step 304 of FIG. 3; and determines a change in illumination required to meet the desired level of brightness for the localized area 412. In this example, the distance D1-D4 of the lighting devices 401-404 from the localized area 412, and the current illumination levels L1-L4 of the respective lighting devices 401-404 is utilized by the lighting controller 70 to calculate the current illumination level at localized area 412 in accordance with step 305 of FIG. 3. The lighting controller 70 next determines a change in illumination required at the localized area 412 to meet the desired illumination level selected by the user 419 (depicted in FIG. 4A).

With continued reference to FIG. 4B, the lighting controller 70 generates instructions for one or more controllers (not shown) of the lighting devices 401-404, and sends the instructions to the one or more controllers (e.g., controller 63A, control module 63B) to initiate changes in the lighting devices 401-404 necessary to meet the desired illumination level of the user 419. In this example, the lighting controller 70 sends instructions to change the illumination level of lighting devices 401-403 by different amounts, as well as instructions to change the position of the lighting device 404 from a first position 430, to a second position 431 closer to the localized area 412, in order to obtain a desired aggregate illumination level at the localized area 412. In aspects, while changing the level of brightness, software of the lighting controller 70 also calculates the impact of illumination levels on other localized areas of the location 400, such as a secondary localized area 440, and automatically selects an optimum level of brightness in different lighting devices 401-404 to meet illumination goals across the location 400 (including illumination goals for localized areas 412 and 440).

Based on the above, systems and methods of the present invention address the situation where multiple light sources are installed in a defined location, and each light source contributes different levels of illumination to a point within the defined location. In aspects, the user computer device 60 and/or the lighting controller 70 knows the current position of various lighting systems in the defined location. Optionally, the position of the lighting is dynamic; in this case the user computer device 60 and/or lighting controller 70 determines the relative position of the moving lighting equipment within the defined location. In implementations, the user computer device 60 and/or lighting controller 70 determine a current level of brightness at each of the light sources.

In aspects, a user can use a mobile device (e.g., the user computer device 60) to select one or more areas of interest (localized areas), and using a finger gesture, for example, the user can graphically change the illumination level at the selected areas. Based on the selected illumination level if the area, embodiments of the present invention enable the user computer device 60 or the lighting controller 70 to perform calculations to determine changes necessary to obtain the desired illumination level at the selected areas based on aggregated illumination levels from the various lighting sources (e.g., 401-404).

In embodiments, based on the change in the illumination level needed, a mobile device (e.g., smartphone 416) will identify the percentage of change in the selected locations and then will identify the brightness level in different lighting sources, or changes in the position of the light sources (e.g. a drone is carrying a light) needed to meet the illumination goals for the selected locations. While selecting a required illumination level in one or more select areas, a user can select various event or calendar based rules, and the user computer device 60 or lighting controller 70 will act accordingly to implement necessary illumination levels at the various light sources.

As an example, one computer-implemented method of the present invention includes: identifying one or more light sources in an area, wherein at least one of the light sources could be adjusted; identifying the location of the light sources in relation to other light sources as well as a user; receiving a user selection on a visual display of the area with the light sources, wherein the user selection is an indication to change the amount of light for the localized area of selection; calculating which lights to change the intensity and the amount of change required to reach a level of brightness the user desires; and adjusting the lighting sources in the area. In implementations, the selection on the visual display is a movable object (e.g., a person) and the lighting adjusts in the area to keep the movable object at a consistent level of brightness. In aspects, the visual display is an augmented reality display that adjust brightness reality to conform to the user's preference in augmented reality. In embodiments, the method further includes identifying historical trends of a user to automatically select a brightness for an area or object based on past user preferences.

In embodiments, a service provider could offer to perform the processes described herein. In this case, the service provider can create, maintain, deploy, support, etc., the computer infrastructure that performs the process steps of the invention for one or more customers. These customers may be, for example, any business that uses technology. In return, the service provider can receive payment from the customer(s) under a subscription and/or fee agreement and/ or the service provider can receive payment from the sale of advertising content to one or more third parties.

In still another embodiment, the invention provides a computer-implemented method for automatic illumination of a target area based on aggregate illumination from multiple light sources. In this case, a computer infrastructure, such as computer system 12 (FIG. 1), can be provided and one or more systems for performing the processes of the invention can be obtained (e.g., created, purchased, used, modified, etc.) and deployed to the computer infrastructure. To this extent, the deployment of a system can comprise one or more of: (1) installing program code on a computing device, such as computer system 12 (as shown in FIG. 1), from a computer-readable medium; (2) adding one or more computing devices to the computer infrastructure; and (3) incorporating and/or modifying one or more existing systems of the computer infrastructure to enable the computer infrastructure to perform the processes of the invention.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method, comprising:
   calculating, by a computing device, an illumination level at a localized area of a defined physical location based on current illumination levels of a plurality of lighting devices within the defined physical location and locations of the plurality of lighting devices within the defined physical location;
   generating, by the computing device, instructions to effect a change in one or more lighting devices of the plurality of lighting devices, wherein the change in the one or more lighting devices results in a desired level of brightness for the localized area; and
   sending, by the computing device, the instructions to at least one controller of the one or more lighting devices.

2. The computer-implemented method of claim 1, wherein the instructions include instructions to change an illumination level for each of the one or more lighting devices, and wherein each of the changes in the illumination level are different.

3. The computer-implemented method of claim 1, wherein the instructions include instructions to change a position of the one or more lighting devices within the defined physical location.

4. The computer-implemented method of claim 1, further comprising:
   determining, by the computing device, the locations of the plurality of lighting devices within the defined physical location; and
   determining, by the computing device, the current illuminations levels for each of the plurality of lighting devices.

5. The computer-implemented method of claim 1, further comprising determining, by the computing device, a change in the illumination level required to meet the desired level of brightness for the localized area.

6. The computer-implemented method of claim 1, wherein the determining the desired level of brightness for the localized area is based on a predefined lighting rule.

7. The computer-implemented method of claim 1, wherein the localized area comprises a current location of a movable object within the defined physical location, and wherein the calculating the illumination level at the localized area, the generating the instructions to effect the change in the one or more of the lighting devices, and the sending the instructions to the at least one controller, are performed on a continuous or periodic basis based on movement of the movable object within the defined physical location.

8. The computer-implemented method of claim 1, further comprising receiving, by the computing device, lighting instructions from the user regarding the desired level of brightness for the localized area, wherein the desired level of brightness for the localized area is based on the lighting instructions.

9. The computer-implemented method of claim 1, further comprising determining, by the computing device, historic lighting trends associated with a user of the computing device, wherein the desired level of brightness for the localized area is based on the historic lighting trends.

10. The computer-implemented method of claim 1, further comprising determining, by the computing device, that a triggering event has occurred, wherein the generating the instructions to effect the change in the one or more of the lighting devices occurs in response to the triggering event.

11. The computer-implemented method of claim 10, wherein the triggering event comprises sensing that a user is performing a predefined action within the localized area.

12. The computer-implemented method of claim 1, further comprising:
    calculating, by the computing device, an illumination level at another localized area of the defined physical location based on current illumination levels of the plurality of lighting devices within the defined physical location and the locations of the plurality of the lighting devices within the defined physical location;
    generating, by the computing device, secondary instructions to effect a change in one or more of the plurality of lighting devices, wherein the change in the one or more of the plurality of lighting devices results in the desired level of brightness for the localized area and the other localized area; and
    sending, by the computing device, the instructions to at least one controller of the one or more lighting devices.

13. A computer program product comprising a computer readable storage medium having program instructions embodied therewith, the program instructions executable by a computing device to cause the computing device to:

calculate an illumination level at a localized area of a defined physical location based on current illumination levels of a plurality of lighting devices within the defined physical location, and locations of the plurality of lighting devices within the defined physical location;

generate instructions to effect a change in one or more lighting devices of the plurality of lighting devices, wherein the change in the one or more lighting devices results in a desired level of brightness for the localized area; and send the instructions to at least one controller of the one or more lighting devices.

14. The computer program product of claim 13, wherein the instructions are instructions selected from the group consisting of: instructions to change the illumination level of the one or more lighting devices; instructions to change a position of the one or more lighting devices within the defined physical location; and combinations thereof.

15. The computer program product of claim 13, further comprising:

determining, by the computing device, the locations of the plurality of lighting devices within the defined physical location;

determining, by the computing device, the current illuminations levels for each of the plurality of lighting devices; and determining, by the computing device, a change in illumination for each of the plurality of lighting devices required to meet the desired level of brightness for the localized area.

16. A system comprising:

a processor, a computer readable memory and a computer readable storage medium associated with a computing device;

program instructions to calculate an illumination level at a localized area of a defined physical location based on current illumination levels of a plurality of lighting devices within the defined physical location and locations of the plurality of lighting devices within the defined physical location;

program instructions to generate instructions to effect a change in one or more lighting devices of the plurality of lighting devices, wherein the change in the one or more lighting devices results in a desired level of brightness for the localized area; and program instructions to send the instructions to at least one controller of the one or more lighting devices;

wherein the program instructions are stored on the computer readable storage medium for execution by the processor via the computer readable memory.

17. The system of claim 16, further comprising at least one of: a sensor; an on-site camera; and a lighting transport device.

18. The system of claim 16, wherein the instructions include at least one instructions selected from the group consisting of: instructions to change the illumination level of the one or more lighting devices; and instructions to change a position of the one or more lighting devices within the defined physical location.

19. The system of claim 16, further comprising program instructions to determine that a triggering event has occurred, wherein the generating the instructions to effect the change in the one or more of the lighting devices occurs in response to the triggering event.

20. The system of claim 16, further comprising program instructions to determine the desired level of brightness for the localized area based on stored user preference data.

* * * * *